United States Patent
Zhao

(10) Patent No.: US 9,513,732 B2
(45) Date of Patent: Dec. 6, 2016

(54) CAPACITIVE IN-CELL TOUCH-SCREEN PANEL AND DISPLAY DEVICE

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 214 days.

(21) Appl. No.: 13/995,327

(22) PCT Filed: Nov. 8, 2012

(86) PCT No.: PCT/CN2012/084326
§ 371 (c)(1),
(2) Date: Jun. 18, 2013

(87) PCT Pub. No.: WO2014/000363
PCT Pub. Date: Jan. 3, 2014

(65) Prior Publication Data
US 2014/0055411 A1 Feb. 27, 2014

(30) Foreign Application Priority Data
Jun. 29, 2012 (CN) .......................... 2012 1 0226873

(51) Int. Cl.
G06F 3/045 (2006.01)
G06F 3/041 (2006.01)
G06F 3/044 (2006.01)

(52) U.S. Cl.
CPC ............ *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2007/0171115 A1 | 7/2007 | Kim et al. | |
| 2008/0018581 A1 | 1/2008 | Park et al. | |
| 2010/0194698 A1* | 8/2010 | Hotelling | G06F 1/3218 345/173 |
| 2010/0253638 A1* | 10/2010 | Yousefpor | G06F 3/0416 345/173 |
| 2011/0216039 A1 | 9/2011 | Chen et al. | |
| 2011/0242031 A1 | 10/2011 | Cheng et al. | |
| 2012/0044195 A1 | 2/2012 | Nakanishi et al. | |

FOREIGN PATENT DOCUMENTS

| | | |
|---|---|---|
| CN | 101825813 A | 9/2010 |
| CN | 101866228 A | 10/2010 |

(Continued)

OTHER PUBLICATIONS

International Search Report mailed Apr. 4, 2013; PCT/CN2012/084326.
First Chinese Office Action mailed Jan. 16, 2014; Appln. No. 201210226873.5.

(Continued)

*Primary Examiner* — Nicholas Lee
(74) *Attorney, Agent, or Firm* — Ladas & Parry LLP

(57) ABSTRACT

The present invention discloses a capacitive in-cell touch-screen panel and a display device, comprising: a touch scanning line, implemented by at least one gate line of a TFT array substrate; and a touch driver circuit connected with the touch scanning line and adapted to load touch scan signals to the touch scanning line. Compared with that an existing GOA is used to provide touch scan signals to touch scanning lines of a small-sized touch-screen panel, that a separate touch driver circuit is used to provide touch scan signals to a gate line acting as a touch scanning line can avoid a signal-delay problem.

7 Claims, 2 Drawing Sheets

(56) References Cited

FOREIGN PATENT DOCUMENTS

| CN | 102117607 A | 7/2011 |
|---|---|---|
| CN | 102222475 A | 10/2011 |
| CN | 102455812 A | 5/2012 |
| CN | 102750062 A | 10/2012 |
| JP | 1139093 A | 2/1999 |
| JP | 2007-334347 A | 12/2007 |
| KR | 20100005855 A | 1/2010 |

OTHER PUBLICATIONS

Second Chinese Office Action dated Aug. 1, 2014; Appln. No. 201210226873.5.

International Preliminary Report on Patentability dated Dec. 31, 2014; PCT/CN2012/084326.

Korean Office Action dated Dec. 31, 2014; Appln. No. 10-2013-7015431.

Third Chinese Office Action dated Jan. 4, 2015; Appln. No. 201210226873.5.

Fourth Chinese Office Action Appln. No. 201210226873.5; Dated Jun. 2, 2015.

Extended European Search Report dated Jan. 21, 2016; Appln. No. 12852441.0-1972/2869169.

Fifth Chinese Office Action Appln. No. 201210226873.5; Dated Sep. 2, 2015.

Japanese Office Action dated Sep. 16, 2016, Appln. No. 2015-518781.

* cited by examiner

CAPACITIVE IN-CELL TOUCH-SCREEN PANEL AND DISPLAY DEVICE

TECHNICAL FIELD

The present invention relates to a capacitive in-cell touch-screen panel and a display device.

BACKGROUND

With rapid development of display technologies, touch-screen panels have been gradually applied throughout in people's life. At present, touch-screen panels, according to their working principles, can be classified as: resistive type, capacitive type, infrared type, and surface acoustic wave type. Among them, capacitive touch-screen panels, by virtue of their unique touch principles and their advantages of high sensitivity, long life and high light transmittance, etc., have become the most favorable and pursued products in the industry.

Nowadays, in order to make a capacitive touch-screen panel thinner, a kind of capacitive in-cell touch-screen panels has appeared, in which touch electrodes are manufactured inside of its color-filter substrate; for example, on an existing TFT (Thin Film Transistor) array substrate, touch scanning lines and touch sensing lines are directly added to achieve a touch function; that is, on the surface of the TFT array substrate, two layers of strip-like ITO (Indium Tin Oxides) electrodes that are intersected each other on different levels (non-coplanar intersection) are provided, and these two layers of ITO electrodes are used as touch scanning lines and touch sensing lines of the touch-screen panel, respectively, meanwhile an inductive capacitor is formed at a non-coplanar intersection position between two ITO electrodes.

Also for example, because the touch precision of a touch-screen panel is typically on a millimeter-order, whereas the display precision of a ITT array substrate is typically on a micron-order; therefore, the required touch scanning lines and touch sensing lines for a touch screen are much less in amount than the driving lines (data lines and gate lines) required for the display function of a TFT array substrate; moreover, in a TFT array substrate, the data line and the gate line corresponding to each TFT intersect in a non-coplanar way, that is, the two lines are mutually insulated while their projections along a vertical direction intersect each other, thus part of the driving lines (data lines and gate lines) in a TFT array substrate can be used as touch lines (touch scanning lines and touch sensing lines) of a touch-screen panel, and inductive capacitors are formed at the non-coplanar intersection positions of the data lines and gate lines. so that the function of a capacitive touch-screen panel can be achieved.

The working process of the above-described two types of capacitive in-cell touch-screen panels is: when an ITO electrode acting as a touch scanning line is loaded with touch scan signals, coupled voltage signals that are obtained by a touch sensing line via an inductive capacitor are detected; and during this process, when a human body contacts the touch-screen panel, the human body electric field will act on the inductive capacitor, causing the capacitance value of the inductive capacitor to change, and further cause the coupled voltage signals obtained by the touch sensing line to change; then, according to the changes of the voltage signals, the position of the touch-point can be determined.

A touch-screen panel having a high resolution needs to be prepared by using one-chip technology, which integrates gate driver circuits in order to reduce the areas of the panel periphery circuits; thus, in the case where a gate line is also used as a touch scanning line, touch scan signals also have to be provided by the corresponding integrated gate driver circuit. For the integrated gate driver circuit, such as a GOA (Gate Driver on Array, which is an array substrate row-driver circuit), when it provides gate drive signals to gate lines, generally, at least one shift-register circuit is required for one GOA circuit to output one gate drive signal, and thus, N shift-register circuits are required for N gate lines; therefore, as external clock signals need to enter into these N shift-register circuits simultaneously, a signal-delay problem will occur; on the other hand, touch scanning lines have more stringent real-time requirements on touch scan signals, if an existing integrated gate drive circuit (e.g., GOA) is directly used to provide touch scan signals for a touch scanning line, a signal-delay problem will occur, and this will lead to the problem that a touch operation cannot be identified properly.

SUMMARY

Embodiments of the present invention provide a capacitive in-cell touch-screen panel and a display device, capable to solve a signal-delay problem related to an existing GOA in outputting touch scan signals to touch scanning lines.

According to an embodiment of the present invention, there is provided a capacitive in-cell touch-screen panel, comprising: a touch scanning line, implemented by at least one gate line of a TFT array substrate; the touch-screen panel further comprises: a touch driver circuit connected with the touch scanning line and adapted to load touch scan signals to the touch scanning line.

An embodiment of the present invention further provides a display device, which comprises a capacitive in-cell touch-screen panel in accordance with an embodiment of the present invention.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention. Unless otherwise defined, technical or scientific terms used herein should be interpreted in the usual sense as understood by those ordinary skilled in the relevant art of the present invention. The wordings "first", "second", and the like, used in the specification and claims of this patent application of the invention, do not denote any order, quantity, or importance, but are adapted to distinguish among different integral parts. Similarly, the terms "a", "an", "the" or the like herein do not denote a limitation of quantity, but rather denote the presence of at least one of the referenced item.

Figure 1:
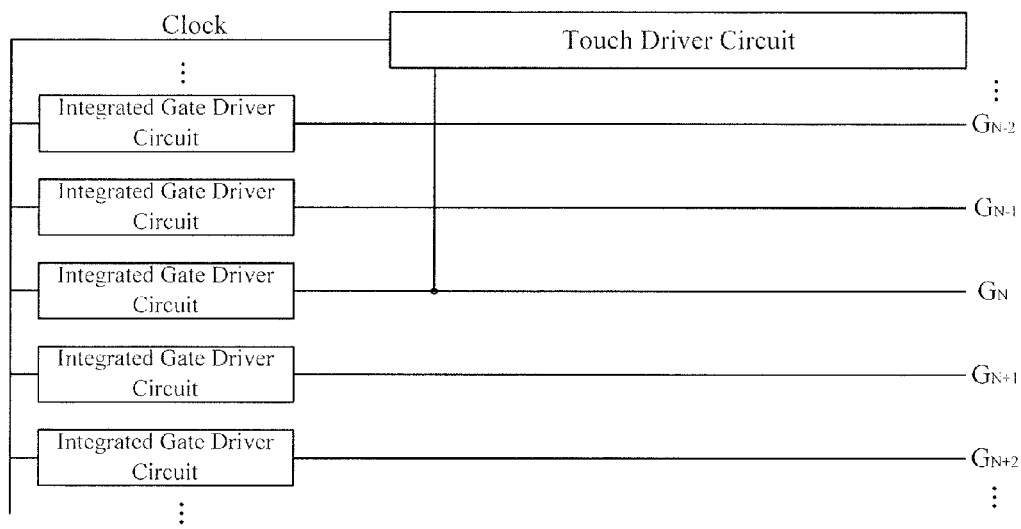
FIG. 1 is a schematic structural diagram of a capacitive in-cell touch-screen panel according to an embodiment of the present invention.

In the drawings, thicknesses of various layers of thin films, as well as shapes and sizes of their regions, do not in scale reflect an array substrate or a color-filter substrate; instead, they are only intended for the purpose of schematic illustration of the technical disclosure herein An embodiment the of the present invention provides a capacitive in-cell touch-screen panel, as shown in FIG. 1, in which at least one gate line of a TFT array substrate is elected as a touch scanning line (in FIG. 1, $G_N$ represents the gate line which is elected as a touch scanning line), and the touch-screen panel further comprises: a touch driver circuit, connected with the touch scanning line and adapted to load touch scan signals to the touch scanning line. The touch driver circuit, as shown by a circuit block located at an upper part of FIG. 1, is connected with both the line Clock and the line $G_N$.

Because the touch precision of a touch-screen panel is typically on a millimeter-order, whereas the display precision of a TFT array substrate is typically on a micron-order, the required touch scanning lines for a touch-screen are much less in amount than the required driving lines (data lines and gate lines) for the display of a TFT array substrate; consequently, the elected touch scanning lines are much less in amount than the gate lines. Therefore, when the gate line acting as a touch scanning line is required to implement a touch function, a separate touch driver circuit is adapted to load touch scan signals to that gate line, and therefore signal delay can be avoided.

For example, in a specific example, the independent touch driver circuit may be integrated within an IC chip used for driving data lines of a TFT array substrate, that is, the touch driver circuit is within the source driver circuit of the TFT array substrate, thus circuit wirings can be saved. In a different example, the touch driver circuit also may be provided independent from a TFT array substrate.

The capacitive in-cell touch-screen panel according to the embodiment of the invention, for example, may further comprises touch switches, each of which is provided between each touch scanning line and the touch driver circuit and used, when the touch scanning line transmits touch scan signals, to switch on the connection between touch driver circuit and the touch scanning line, and, when the touch scanning line transmits gate drive signals, to switch off the connection between the touch scanning line and the touch driver circuit.

For example, each of the touch switches may be provided within the touch driver circuit or may be provided at the connection site of the touch scanning line and the touch driver circuit.

In a specific example, the number of the touch switches should be compatible with the number of the provided touch sensing lines. When the touch switches are provided at the connection sites of the touch scanning lines and touch driver circuit, one touch switch may be implemented as one TFT.

The capacitive in-cell touch-screen panel according to the embodiment of the invention, as shown in FIG. 1, may further comprise integrated gate driver circuits (which are each shown by a circuit block located at the left side of the scan line $G_N$ in FIG. 1), which are connected with the touch scanning lines; and driver switches (not shown in FIG. 1), each of which is provided between each touch scanning line and the integrated gate driver circuit; the integrated gate driver circuit is adapted to load gate drive signals over the touch scanning line; the driver switch is used, when the touch scanning line transmits touch scan signals, to switch off the connection between the integrated gate driver circuit and the touch scanning line, and when the touch scanning line transmits gate drive signals, to switch on the connection between the touch scanning line and the integrated gate driver circuit.

Depending on different examples, each of the driver switches may be provided within the integrated gate driver circuit or may be provided at a connection site of the touch scanning line and the integrated gate driver circuit.

In a specific example, the number of the driver switches should be compatible with the number of the provided touch scanning lines, and when the driver switches are provided at the connection sites of the touch scanning lines and the integrated gate driver circuit, one driver switch may be implemented as one TFT.

In an example, for example, the gate driver circuit may be implemented as a GOA (Gate Driver on Array, which is an array substrate row-driver circuit).

Figure 2:
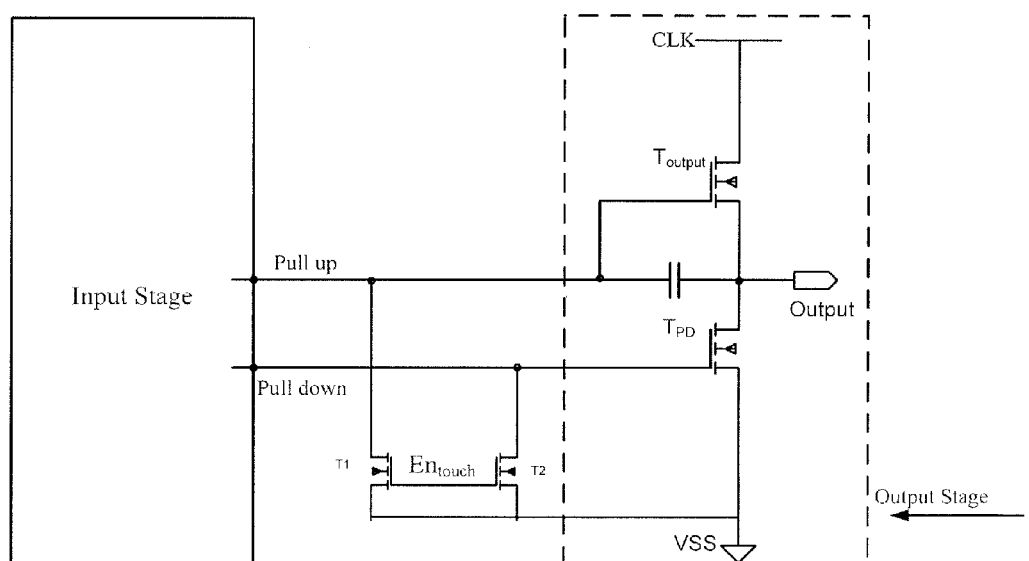
FIG. 2 is a schematic structural diagram of a GOA circuit according to an embodiment of the present invention.

In one example of the present invention, when the gate driver circuits are each implemented as a GOA, each of the driver switches is connected with a pull-up node (Pull up) and a pull-down node (Pull down) of a GOA, respectively. FIG. 2 illustrates a schematic diagram of a GOA circuit after a driver switch is added therein. The original GOA circuit is as shown by the circuit within the dashed-line block. The driver switch comprises two TFTs (T1 and T2); the sources of T1 and T2 are connected with a common ground VSS terminal of the GOA, respectively, and the drains of T1 and T2 are connected with a pull-up node (Pull up) and a pull-down node (Pull down) of the GOA, respectively, and the gates of T1 and T2 are connected to each other.

After the driver switch is added, the GOA possesses a switching function; that is, when the GOA is required to be disconnected with a gate line, it applies $EN_{touch}$ to control T1 and T2 to discharge, thus the voltage at the GOA output terminal (Output) is pull down, and the GOA circuit output signal is maintained at a low level, thereby achieving the purpose of stopping the GOA outputting signals.

Because the output terminal of the GOA connected with a current row gate line is also connected with the input terminal of the GOA connected with the next row gate line and is adapted to input signals to the input terminal; in this way, when the current row gate line acting as a touch scanning line is connected to the touch driver circuit, the GOA connected with the current row will also stop inputting signals to the next row gate line. Therefore, the touch driver circuit, in addition to inputting signals to a touch scanning line connected therewith, is also adapted to, when loading touch scan signals to a touch scanning line, to input signals to the input terminal (Input) of the GOA connected with the next row gate line subsequent to the touch scanning line (the current row gate line), so as to ensure the normal work of the next row gate line.

Figure 3:
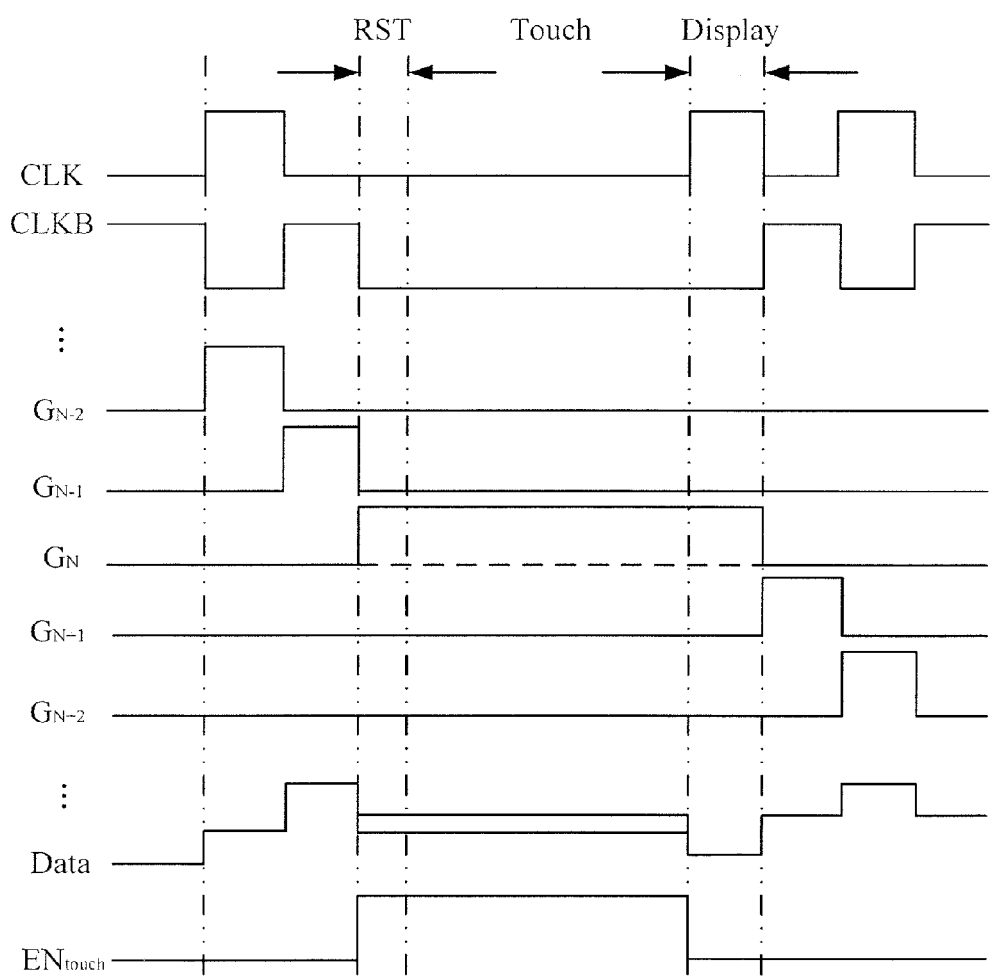
FIG. 3 is a driving timing chart of a capacitive in-cell touch-screen panel according to an embodiment of the present invention.

Below, the capacitive in-cell touch-screen panel according to the embodiment of the invention will be specifically described with one example. For instance, the N-th row gate line is elected as a touch scanning line, the diagram of a GOA circuit connected thereto is as shown in FIG. 2. The driving signal waveforms of the touch-screen panel are shown in FIG. 3, in which CLK and CLKB are GOA drive clock signals; when the touch scanning line $G_N$ transmits touch scan signals, the drive clock signals will remain at a high or low level so as to reduce signal noise.

After the (N-1)-th row gate line $G_{N-1}$ completes transmitting gate drive signals, the GOA connected with the touch scanning line $G_N$ will apply $EN_{touch}$ to control T1 and T2 to discharge, so that a low level is output from the GOA to the touch scanning line $G_N$, that is, the GOA stops outputting electrical signals to the touch scanning line. At this point, the touch driver circuit is connected with the touch scanning line $G_N$, and inputs touch scan signals to the touch scanning line $G_N$.

For example, during the scan period of one-frame, the touch scan signals can be divided into three stages: a reset stage (indicated by RST in FIG. 3), a touch-scan stage (indicated by Touch in FIG. 3), and a display-scan stage (indicated by Display in FIG. 3); the function of the reset stage is to reset the (N-1)-th row gate line and discharge the pixel-voltage of the N-th row touch scanning line, so as to prevent erroneous charging and prevent pixel-voltages from affecting touch scan signals; the touch scan stage is the stage as follows: in this stage, the N-th row touch scanning line is loaded with touch scan signals, and the corresponding data line that is elected as a touch sensing line receives the voltage signals of the touch scan signals, that is, the voltage signals obtained via the formed inductive capacitor and coupling with the touch scan signals; the display-scan stage is the stage in which, after the touch scan stage is completed, the N-th row touch scanning line is subjected to pixel-charging, meanwhile the corresponding touch sensing line transmits normal data drive signals, thereby accomplishing the operation of touch sensing.

Based on the same inventive idea, an embodiment of the present invention further provides a display device, which comprises a capacitive in-cell touch-screen panel in accordance with an embodiment of the present invention.

The embodiments of the present invention provide a capacitive in-cell touch-screen panel and a display device, in which at least one gate line of a TFT array substrate is elected as a touch scanning line; the touch-screen panel and the display device further comprise a touch driver circuit connected with the touch scanning line and adapted to load touch scan signals to the touch scanning line. Compared with the technology of the prior art that uses an existing GOA to provide touch scan signals to touch scanning lines of a small-sized touch-screen panel, the technology disclosed in the present invention uses a separate touch driver circuit to provide touch scan signals to the gate line acting as the touch scanning line. Because the touch scanning lines are much less in amount than the gate lines, and the required touch scan signals to be provided by the touch driver circuits are also much less in amount than the signals to be provided by the gate driver circuits, the technology disclosed in the present invention can avoid the signal-delay problem.

The above are merely exemplary examples of the present invention, but not for limiting the scope of the invention; instead, the scope of the invention should be defined by the appended claims.

The invention claimed is:

1. A capacitive in-cell touch-screen panel, comprising: a touch scanning line, implemented by at least one gate line of a TFT array substrate; wherein the touch-screen panel further comprises:
   a touch driver circuit connected with the touch scanning line and adapted to load touch scan signals to the touch scanning line;
   an integrated gate driver circuit, connected with the touch scanning line;
   a driver switch, provided between the touch scanning line and the integrated gate driver circuit;
   wherein the integrated gate driver circuit is adapted to load gate drive signals to the touch scanning line;
   wherein the driver switch is adapted, when the touch scanning line transmits touch scan signals, to switch off the connection between the integrated gate driver circuit and the touch scanning line, and, when the touch scanning line transmits gate drive signals, to switch on the connection between the touch scanning line and the integrated gate driver circuit;
   wherein the integrated gate driver circuit is an array substrate row-driver circuit;
   wherein the driver switch is connected with both a pull-up node (Pull-Up) and a pull-down node (Pull-Down) of the array substrate row-driver circuit; and
   wherein the driver switch comprises two TFTs; sources of the two TFTs are connected with a common ground VSS terminal of the array substrate row-driver circuit, respectively, and drains of the two TFTs are connected with the pull-up node (Pull up) and the pull-down node (Pull down) of the array substrate row-driver circuit, respectively, and gates of the two TFTs are connected mutually.

2. The touch-screen panel according to claim 1, wherein, the touch driver circuit is a source driver circuit of the TFT array substrate.

3. The touch-screen panel according to claim 1, further comprise: a touch switch, provided between the touch scanning line and the touch driver circuit and used, when the touch scanning line transmits touch scan signals, to switch on the connection between touch driver circuit and the touch scanning line, and when the touch scanning line transmits gate drive signals, to switch off the connection between the touch scanning line and the touch driver circuit.

4. The touch-screen panel according to claim 3, wherein the touch switch is provided within the touch driver circuit, or provided at a connection site of the touch scanning line and the touch driver circuit.

5. The touch-screen panel according to claim 1, wherein the driver switch is provided within the integrated gate driver circuit, or provided at a connection site of the touch scanning line and the integrated gate driver circuit.

6. The touch-screen panel according to claim 1, wherein the touch driver circuit is also adapted, when loading touch scan signals to the touch scanning line, to input signals to the input terminal (Input) of the array substrate row-driver circuit connected with a next row gate line subsequent to that touch scanning line.

7. A display device, comprising a capacitive in-cell touch-screen panel in accordance with claim 1.

* * * * *